US011988377B2

(12) United States Patent
Liu

(10) Patent No.: US 11,988,377 B2
(45) Date of Patent: May 21, 2024

(54) HEATING ELEMENT

(71) Applicant: Aspire North America LLC, Los Angeles, CA (US)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 244 days.

(21) Appl. No.: 17/168,137

(22) Filed: Feb. 4, 2021

(65) Prior Publication Data

US 2022/0163195 A1 May 26, 2022

(30) Foreign Application Priority Data

Nov. 26, 2020 (CN) ......................... 202011344634.0
Nov. 26, 2020 (CN) ......................... 202022771045.2

(51) Int. Cl.

| | |
|---|---|
| ***F22B 1/28*** | (2006.01) |
| ***A24F 40/10*** | (2020.01) |
| ***A24F 40/46*** | (2020.01) |
| ***H05B 3/06*** | (2006.01) |
| ***H05B 3/16*** | (2006.01) |

(52) U.S. Cl.

CPC .............. *F22B 1/284* (2013.01); *A24F 40/10* (2020.01); *A24F 40/46* (2020.01); *H05B 3/06* (2013.01); *H05B 3/16* (2013.01)

(58) Field of Classification Search

CPC ........ A24F 40/46; A24F 40/10; A24F 40/485; H05B 3/06; H05B 3/16; H05B 3/26; H05B 3/265; H05B 3/44; H05B 2203/003; H05B 2203/014021; H05B 2203/022; A61L 9/037; F22B 1/284

See application file for complete search history.

(56) References Cited

U.S. PATENT DOCUMENTS

2014/0109921 A1* 4/2014 Chen ....................... A24F 40/44 131/273
2015/0272218 A1* 10/2015 Chen ..................... A61M 15/06 131/329
2016/0007655 A1* 1/2016 Li ........................... A24F 40/46 392/390
2016/0309786 A1* 10/2016 Holtz ....................... H05B 3/06
2018/0020737 A1* 1/2018 Mironov ................... F16T 1/00 131/329
2018/0132532 A1* 5/2018 Batista .................... A24F 40/46

FOREIGN PATENT DOCUMENTS

CN 207444278 U * 6/2018
KR 20120092771 A * 8/2012 ............ A61M 15/06

OTHER PUBLICATIONS

Translation of CN 207444278 U (Year: 2018).*
Translation of KR-20120092771-A (Year: 2012).*

* cited by examiner

*Primary Examiner* — Hung D Nguyen
(74) *Attorney, Agent, or Firm* — MATTHIAS SCHOLL P.C.; Matthias Scholl

(57) ABSTRACT

A heating element includes a body, a heating wire, and two pins. The body is a concave member including a through hole. The two pins are disposed on two ends of the heating wire, respectively.

4 Claims, 5 Drawing Sheets

HEATING ELEMENT

CROSS-REFERENCE TO RELATED APPLICATIONS

Pursuant to 35 U.S.C. § 119 and the Paris Convention Treaty, this application claims foreign priority to Chinese Patent Application No. 202011344634.0 filed on Nov. 26, 2020, to Chinese Patent Application No. 202022771045.2 filed on Nov. 26, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a heating element for an atomizer.

Conventional heating elements are a cylinder including a single through hole or two through holes, and the heating wire is vertically overlapped and disposed in the single through hole or the two through holes. In this way, the atomizer must be designed with a support for supporting the heating wire and an air tube connecting to the heating element for vapor and air conduction. Thus, the atomizer is costly.

SUMMARY

The disclosure provides a heating element, comprising a body, a heating wire, and two pins; the body is a concave member comprising a through hole; and the two pins are disposed on two ends of the heating wire, respectively.

In a class of this embodiment, the heating wire is a flat structure attached to the bottom end of the body.

In a class of this embodiment, the heating wire is formed by more than two alloy wires arranged in one plane in the shape of a sieve, a net, or a lattice, and the more than two alloy wires are disposed in parallel or in series on a bottom of the body or disposed around the body.

In a class of this embodiment, the body comprises a cylinder and a step disposed around the cylinder; the step comprises a surface comprising at least one groove configured to expel bubbles produced during e-liquid injection.

In a class of this embodiment, the shape of the through hole includes but is not limited to circle, ellipse, triangle, quadrilateral, polygon, and mesh.

In a class of this embodiment, the shape of the body includes but is not limited to a cylinder, a cube, a hemisphere, a taper, and a polygon; and the body comprises quartz, crystal, mica, jade, or a combination thereof.

In a class of this embodiment, the body comprises a cylinder and a step is disposed around the cylinder; and the cylinder comprises a flat surface and a through hole.

DETAILED DESCRIPTION

To further illustrate, embodiments detailing a heating element are described below. It should be noted that the following embodiments are intended to describe and not to limit the disclosure.

Figure 1:
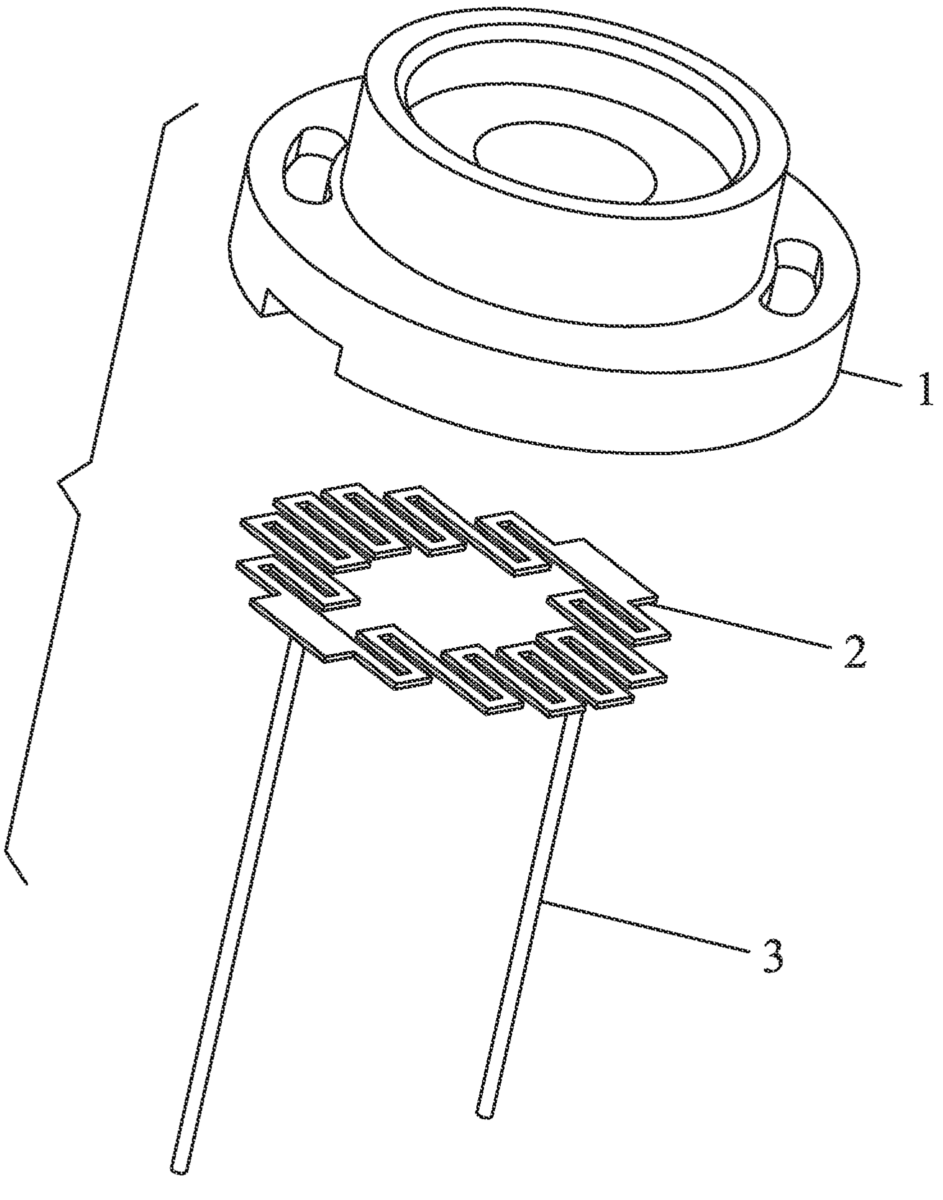
FIG. 1 is an exploded view of a heating element in accordance with one embodiment of the disclosure.
Figure 2:
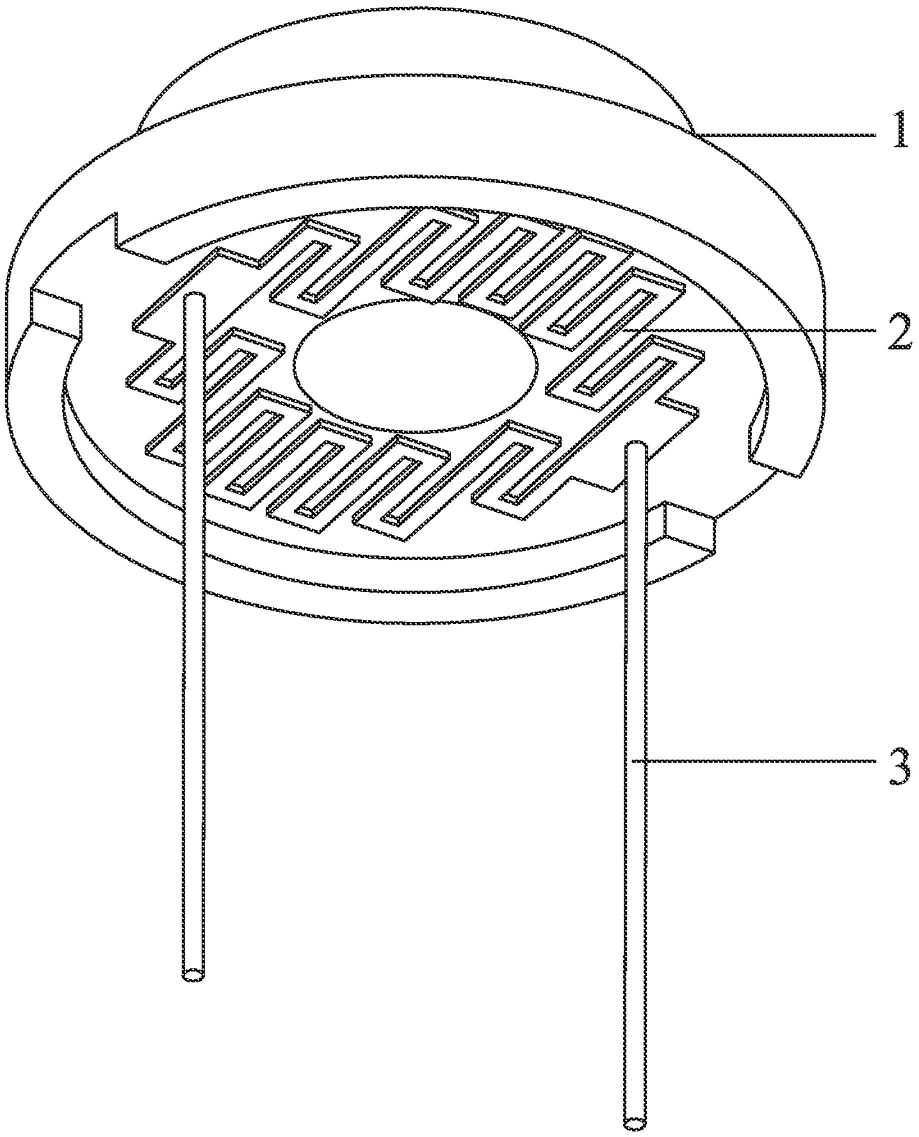
FIG. 2 is a schematic diagram of a heating element in accordance with one embodiment of the disclosure.
Figure 3:
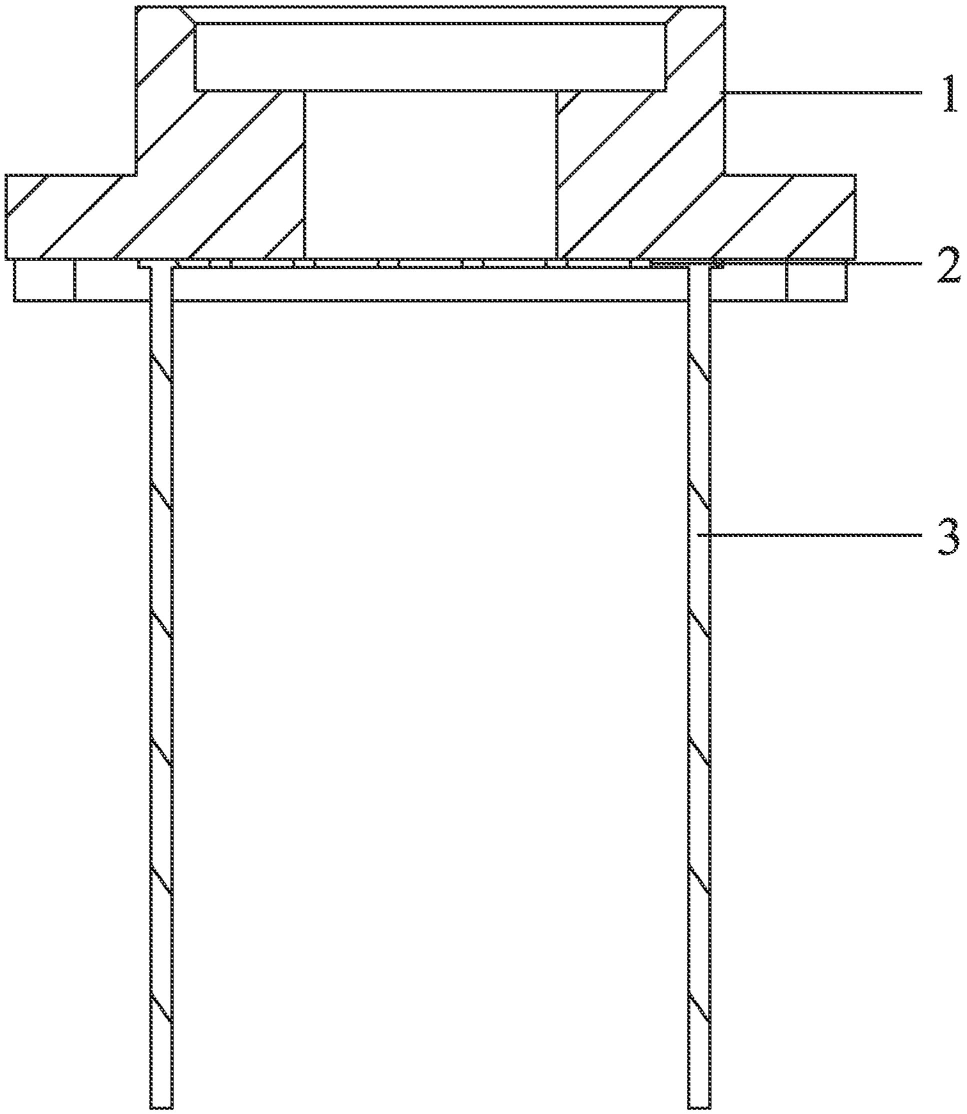
FIG. 3 is a sectional view of a heating element in accordance with one embodiment of the disclosure.
Figure 4:
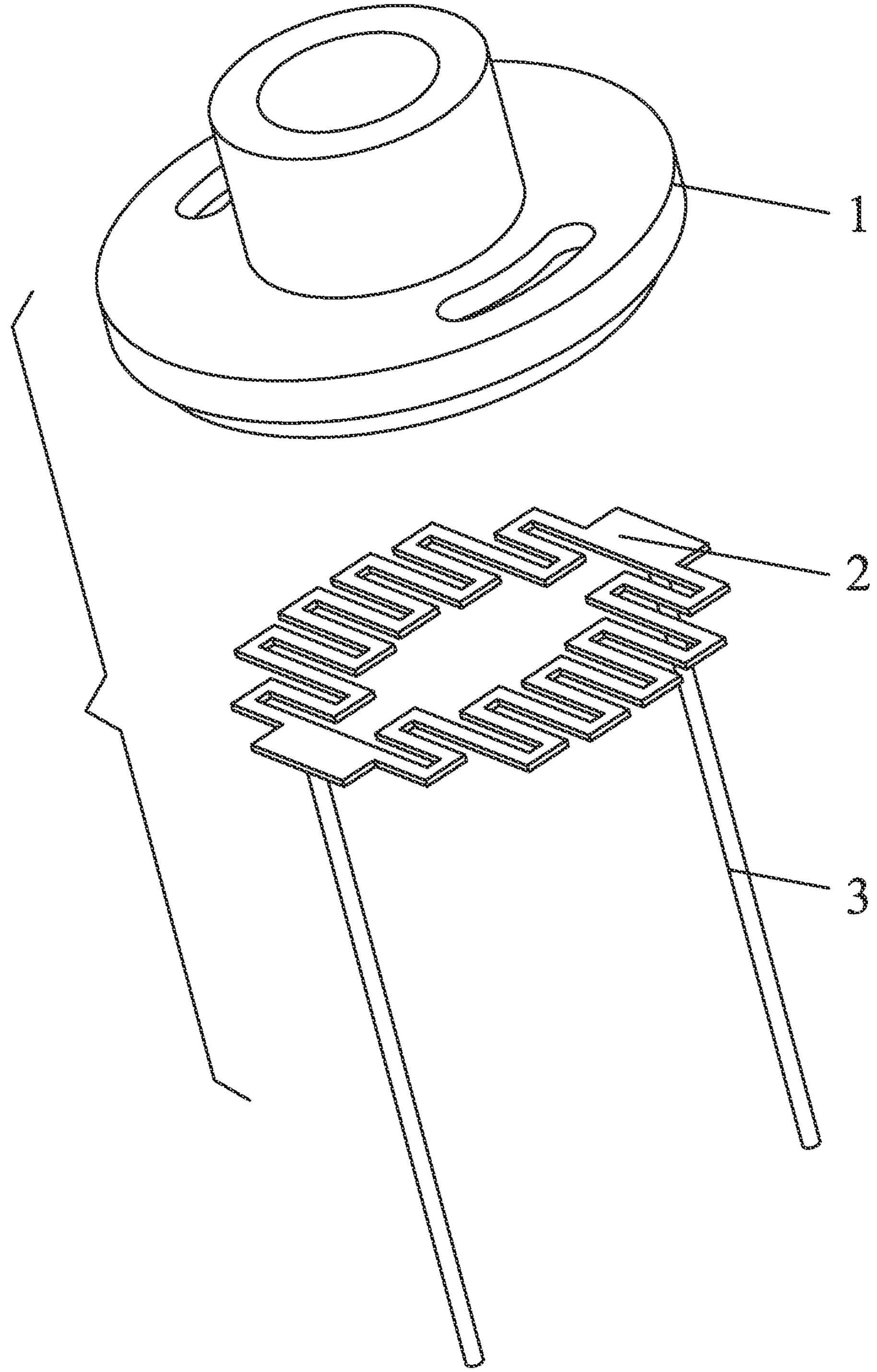
FIG. 4 is a schematic diagram of a heating element in accordance with one embodiment of the disclosure.
Figure 5:
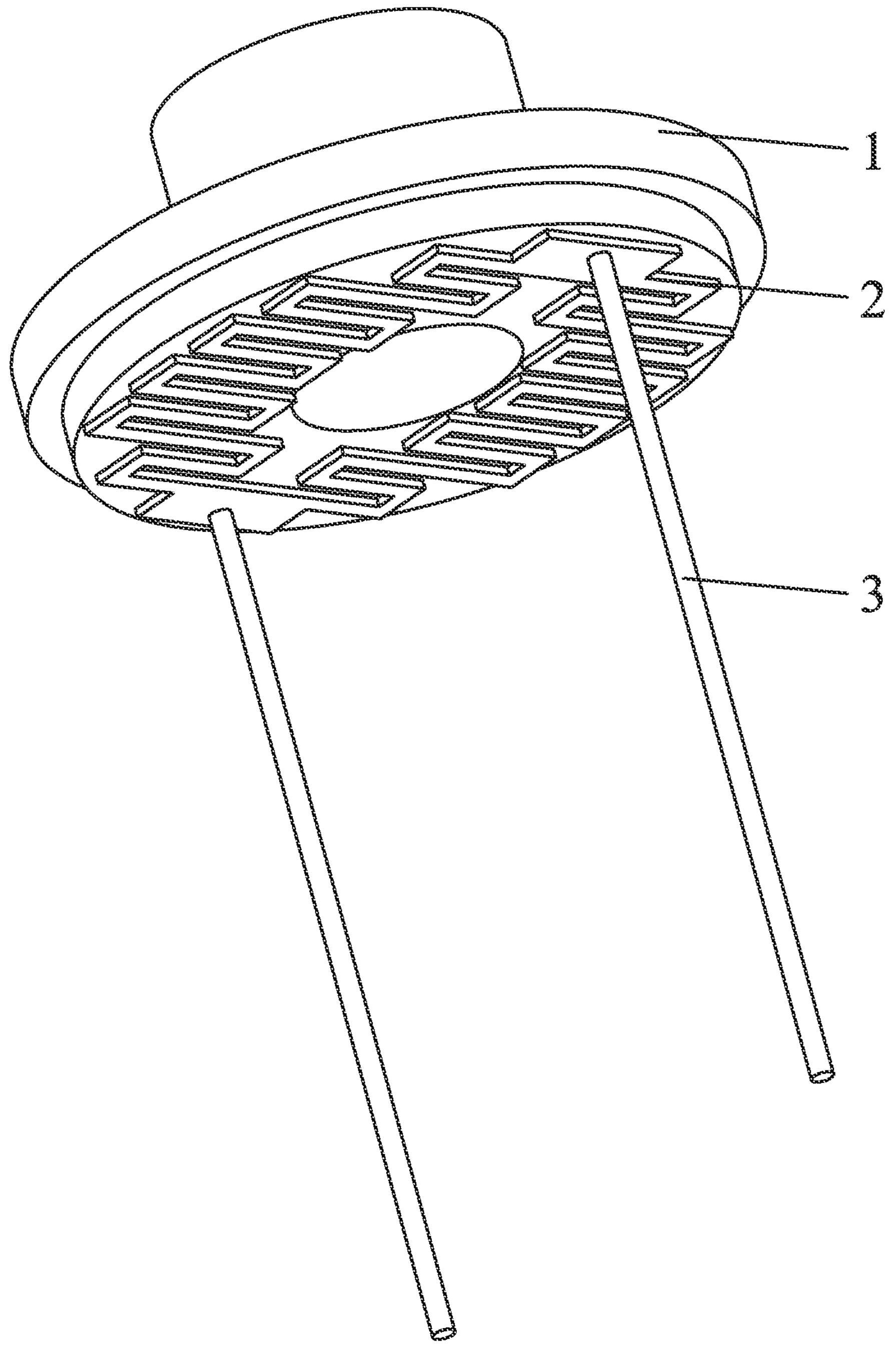
FIG. 5 is a schematic diagram of a heating element in accordance with another embodiment of the disclosure.

As shown in FIGS. 1-5, the disclosure provides a heating element of an atomizer comprises a body 1, a heating wire 2, and two pins 3. The body 1 comprises a cylinder and a step disposed around the cylinder. The cylinder comprises a through hole. The two pins 3 are disposed on two ends of the heating wire 2, respectively. The heating wire 2 is a metal wire horizontally bent back and forth in a plane. The heating wire 2 is attached to the bottom end of the body 1. When in use, the heating element is disposed in an atomizer. In a power on state, the heating wire produces heat and the heat is transferred to the body 1 to atomize the c-liquid therein. A guide tube is connected to the body 1 and communicates with the through hole for vapor conduction. The air enters the through hole and drives the vapor produced in the body to flow through the guide tube and to be inhaled by users.

In certain embodiments, the body 1 comprises quartz, crystal, mica, jade, or a combination thereof. The shape of the body includes but is not limited to a cylinder, a cube, a hemisphere, a taper, and a polygon, each of which comprises a concave surface and a through hole. The shape of the through hole includes but is not limited to circle, ellipse, triangle, quadrilateral, polygon, and mesh. In certain embodiments, the heating wire 2 is formed by more than two alloy wires arranged in one plane in the shape of a sieve, a net, or a lattice, and the more than two alloy wires are disposed in parallel or in series on the bottom of the body 1 or disposed around the body 1.

The following advantages are associated with the heating element of an atomizer of the disclosure:

1. The body of the heating element comprises a cylinder and a step disposed around the cylinder. The cylinder comprises a through hole. A guide tube of an atomizer is connected to the body and communicates with the through hole for vapor conduction, thus reducing the cost of the atomizer.

2. The heating wire is a metal wire horizontally bent back and forth in a plane and is attached to the bottom end of the body instead of being disposed in a single through hole or two through holes as conventional heating elements. The design is novel and is easy to implement.

It will be obvious to those skilled in the art that changes and modifications may be made, and therefore, the aim in the appended claims is to cover all such changes and modifications.

What is claimed is:

1. A heating element for vaporizing an e-liquid, comprising a vaporizing body, a heating wire for generating heat and transferring heat to the vaporizing body, and two pins; wherein:

the vaporizing body is adapted to contain the e-liquid, and the vaporizing body is adapted to receive heat from the heating wire and vaporize the e-liquid to generate vapor;

the vaporizing body comprises a plate member, a columnar member, and a through hole;

the plate member comprises a first flat surface and a second flat surface opposite to the first flat surface;

the columnar member extends out from the first flat surface;

the heating wire has a flat structure and is attached to the second flat surface;

the through hole extends through the plate member and the columnar member, and is adapted to convey the vapor;

the two pins are disposed on two ends of the heating wire, respectively;

the shape of the columnar member is one of a cylinder, a cube, and a polygon; and the vaporizing body comprises quartz, mica, jade, or a combination thereof; and the columnar member comprises a first flat end surface connected to the first flat surface, a second flat end surface opposite to the first flat end surface, and an annular recess indented from the second flat end surface towards the first flat end surface.

2. The heating device of claim 1, wherein the heating wire is formed by more than two alloy wires arranged in one plane, and the more than two alloy wires are disposed in parallel or in series.

3. The heating device of claim 1, wherein the plate member has a larger diameter than the columnar member whereby a step is formed around the columnar member.

4. The heating device of claim 1, wherein a shape of the through hole is one of a circle, ellipse, triangle, quadrilateral, polygon, and mesh.

* * * * *